Patented Mar. 7, 1950

2,499,975

UNITED STATES PATENT OFFICE 2,499,975

MANUFACTURE OF ORGANIC MONOSULFIDES

Walter A. Robshaw, Wrexham, Wales, assignor to Monsanto Chemical Company, St. Louis, Mo., a corporation of Delaware No Drawing. Application April 9, 1948, Serial No. 20,105. In Great Britain May 9, 1944

7 Claims. (Cl. 260—247)

This invention relates to the manufacture of organic monosulfides. More particularly, this invention relates to the manufacture of thiuram monosulfides.

It has been proposed to prepare thiuram monosulfides by first preparing a thiuram disulfide and then converting the thiuram disulfide to the corresponding monosulfide by treatment with an aqueous alcoholic solution of an alkali or alkaline earth metal cyanide.

In accordance with the present invention it has now been found that a new and very convenient process for the manufacture of a thiuram monosulfide consists in oxidizing a soluble salt of a dithiocarbamic acid in the presence of a soluble cyanide. Thus, substituted thiuram monosulfides are obtained from the corresponding dithiocarbamates by oxidation in the presence of a soluble cyanide. The dithiocarbamates suitable in this present process contain no hydrogen linked to the nitrogen or in other words are derivatives of secondary amines.

The course of the reaction is not completely understood but the overall reaction is represented by the following equation:

$$2RSH + MCN + O \rightarrow R-S-R + MCNS + H_2O$$

where M is an alkali or alkaline earth metal or ammonium radical and R is a thiocarbamyl radical.

The process may be applied to the manufacture of monosulfides from inter alia the corresponding N-alkyl, N-aralkyl dithiocarbamates, as for example an N-methyl benzyl dithiocarbamate, N-alkyl N-alicyclic dithiocarbamates and heterocyclic dithiocarbamates. A particularly efficacious group are dithiocarbamates derived from cyclic secondary aliphatic amines of the group consisting of N-alicyclic N-alkyl amines and heterocyclic amines, typical examples being piperidine, morpholine, pyrrolidine, N-methyl cyclohexylamine, N-ethyl cyclohexylamine, and the like.

The reaction may be carried out in aqueous or in aqueous alcoholic solution at temperatures from around 15° to 100° C.

The salts of the mercapto-containing compounds which have been found suitable for use in this process include those of ammonia, alkali metals, or organic nitrogen bases. The cyanide which may be that of ammonia, an alkali metal, or an alkaline earth metal may be used in the theoretical amount required by the partial equation set out above, or in excess of this amount.

Suitable oxidizing agents include water-soluble persalts, such as ammonium or alkali metal persulfates, perborates, percarbonates or perphosphates. Hydrogen peroxide in acid solution, nitrous acid, ferricyanides, halogens, hypochlorites and hypobromites may also be used.

The oxidizing agent may be added to a solution of the mercapto salt and the cyanide or the solution of the mercapto salt and the cyanide may be added to the oxidizing agent.

Instead of starting with the preformed mercapto compounds, the present process may be carried out by forming the mercapto compound in situ.

Following is a description by way of example of methods of carrying the invention into effect.

Example 1

49.2 parts by weight of 25% sodium hydroxide solution and 34.2 parts by weight (substantially 0.30 mol) of N-methyl cyclohexylamine were placed in 214 parts by weight of water and the solution cooled to 10° C. 23.5 parts by weight (substantially 0.30 mol) of carbon disulfide was added thereto with stirring over a period of one-third of one hour at a temperature of about 18° C. The solution was warmed to 33° C., thereupon a solution of 9.4 parts by weight (substantially 0.17 mol) of 90% sodium cyanide and 50 parts by weight of water was added. The oxidizing solution comprising a mixture of 21.1 parts by weight (substantially 0.16 mol) of 27% hydrogen peroxide solution and 17.05 parts by weight (substantially 0.16 mol) of 95% sulfuric acid in 125 parts by weight of water was added over a period of five-sixths of an hour at about 39° C. A heavy oil was obtained which was taken up with ether and washed neutral and free of sodium thiocyanate. Upon evaporation of the ether, a yield of 32.5 parts by weight of the crude product, a yellow gummy solid, was obtained (63% theory). Recrystallization from alcohol yielded 23.5 parts by weight of a bright yellow solid having a melting point of 103°–104°. The product, di(N-methyl cyclohexyl) thiuram monosulfide, gave an analysis 27.82% sulfur and 8.26% nitrogen. Theoretical values were 28.7% sulfur and 8.38% nitrogen.

Example 2

98.5 parts by weight of 25% sodium hydroxide and 52.1 parts by weight (substantially 0.60 mol) of 98% piperidine were placed in 350 parts by water and the solution cooled to 10° C. 46.7 parts by weight (substantially 0.61 mol) of carbon disulfide was added over one-half hour at 10° C.

The temperature of the solution was allowed to rise to 23° C., whereupon 18.8 parts by weight (substantially 0.35 mol) of 90% sodium cyanide dissolved in 100 parts by weight of water was added over a period of one and one-sixth hours at a temperature range of 30°-39° C. To this solution was added a mixture of 42.2 parts by weight (substantially 0.33 mol) of 27% hydrogen peroxide and 34.1 parts by weight (substantially 0.33 mol) of 95% sulfuric acid in 250 cc. of water over a period of one-quarter of an hour with agitation at substantially 39° C. The solution was cooled to 25° C., filtered, and the residue washed free of sodium thiocyanate. A yield of 73 parts by weight of di(cyclopentamethylene)thiuram monosulfide was obtained, a yellow-green solid (84.3% theory) having a melting point of 111°-114°.

*Example 3*

22 parts by weight (substantially 0.25 mol) of morpholine and 33 parts by weight of 30% sodium hydroxide were placed in 200 parts by weight of water. 19 parts by weight of carbon disulfide (substantially 0.25 mol) was added and the solution kept at a temperature of 20° C. 7 parts by weight (substantially 0.14) of sodium cyanide dissolved in 30 cc. of water was added and the mixture oxidized with a solution consisting of 31.5 parts by weight (substantially 0.14 mol) of ammonium persulfate dissolved in 125 parts by weight of water. A yield of 92% was obtained of a solid material having a melting point of 123° C. which was believed to be di(3-oxapentamethylene) thiuram monosulfide.

Since many embodiments of this invention, differing widely in one or more respects, may be made without departing from the spirit of this invention, it is to be understood that the invention is not limited to the foregoing examples or description.

This application is a continuation-in-part of copending application Serial No. 554,552, filed September 16, 1944, now U. S. Patent 2,453,460.

What is claimed is:

1. The process of manufacturing thiuram monosulfides which consists in oxidizing in aqueous medium an alkali metal salt of a dithiocarbamic acid derived from a saturated single ring heterocyclic secondary amine containing not more than two hetero atoms one of which is nitrogen and at least four carbon atoms in the ring and consisting of carbon and hydrogen in addition to the hetero atoms in the presence of an alkali metal cyanide.

2. The process of manufacturing thiuram monosulfides which consists in oxidizing in aqueous medium an alkali metal salt of the dithiocarbamic acid derived from piperidine in the presence of an alkali metal cyanide.

3. The process of manufacturing thiuram monosulfides which consists in oxidizing in aqueous medium an alkali metal salt of the dithiocarbamic acid derived from morpholine in the presence of an alkali metal cyanide.

4. The process of manufacturing thiuram monosulfides which consists in oxidizing in aqueous medium an alkali metal salt of a dithiocarbamic acid derived from an N-alicyclic N-alkyl amine wherein the alicyclic group consists in a saturated six member ring hydrocarbon group in the presence of an alkali metal cyanide.

5. The process of manufacturing thiuram monosulfides which consists in oxidizing in aqueous medium an alkali metal salt of a dithiocarbamic acid derived from an N-cyclohexyl N-alkyl amine in the presence of an alkali metal cyanide.

6. The process of manufacturing thiuram monosulfides which consists in oxidizing in aqueous medium an alkali metal salt of the dithiocarbamic acid derived from N-methyl cyclohexyl amine in the presence of an alkali metal cyanide.

7. The process of manufacturing thiuram monosulfides which consists in oxidizing a soluble salt of a dithiocarbamic acid derived from a secondary amine selected from the group consisting of N-alicyclic N-alkyl amines and saturated single ring heterocyclic amines in the presence of an inorganic water soluble cyanide, said saturated single ring heterocyclic amines containing not more than two hetero atoms one of which is nitrogen and at least four carbon atoms in the ring and consisting of carbon and hydrogen in addition to the hetero atoms.

WALTER A. ROBSHAW.

REFERENCES CITED

The following references are of record in the file of this patent:

UNITED STATES PATENTS

| Number | Name | Date |
|---|---|---|
| 1,682,920 | Maximoff | Sept. 4, 1928 |
| 2,453,460 | Robshaw | Nov. 9, 1948 |